Nov. 13, 1934.    S. REICH    1,980,597
COLLAPSIBLE EGG BOX
Filed Sept. 14, 1932    2 Sheets-Sheet 1
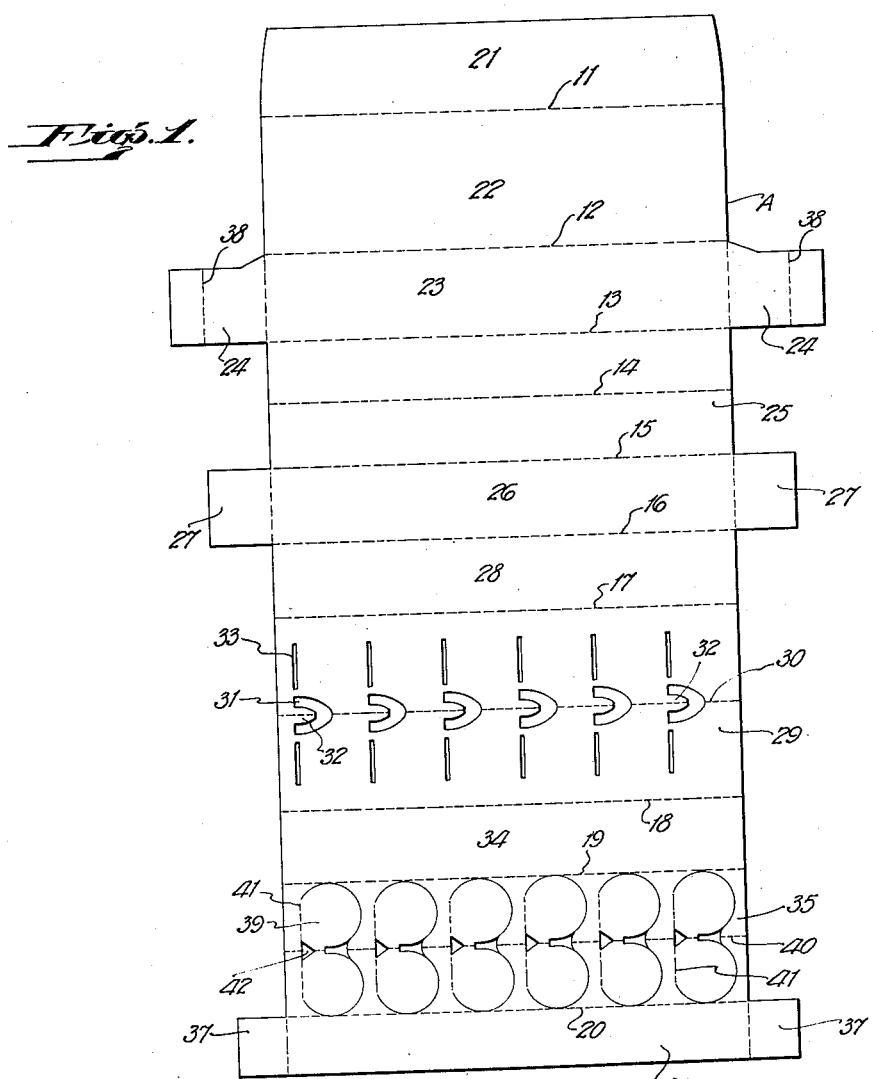
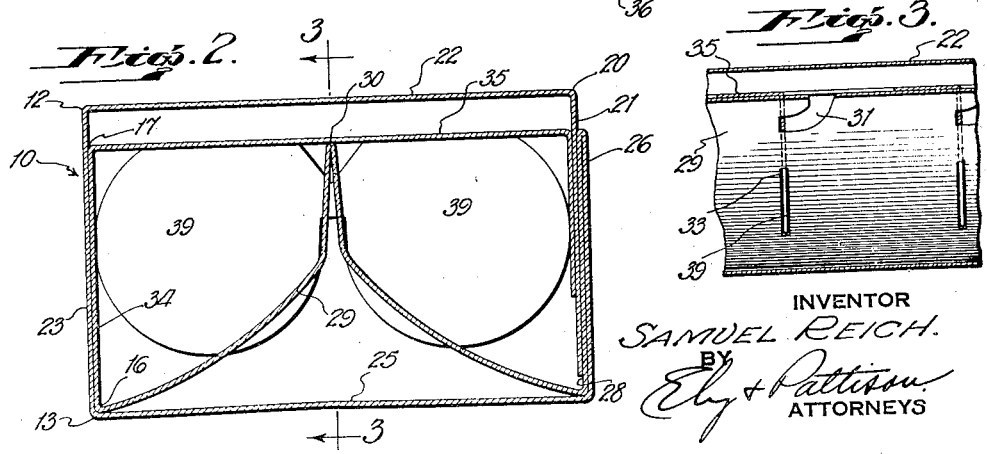
INVENTOR
SAMUEL REICH.
BY
Ely + Pattison
ATTORNEYS Nov. 13, 1934. S. REICH 1,980,597
COLLAPSIBLE EGG BOX
Filed Sept. 14, 1932 2 Sheets-Sheet 2
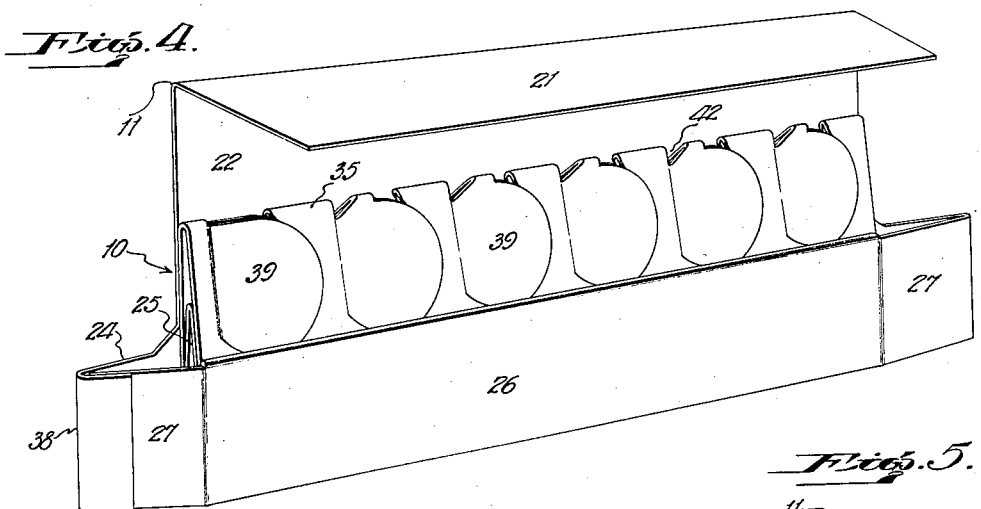
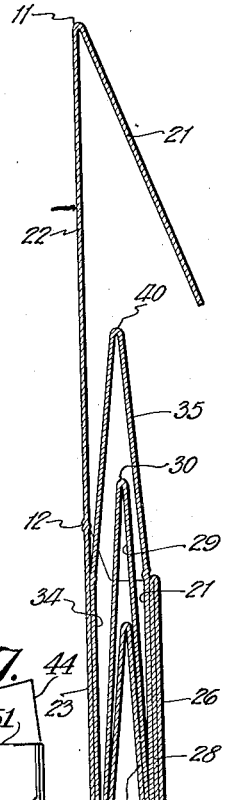
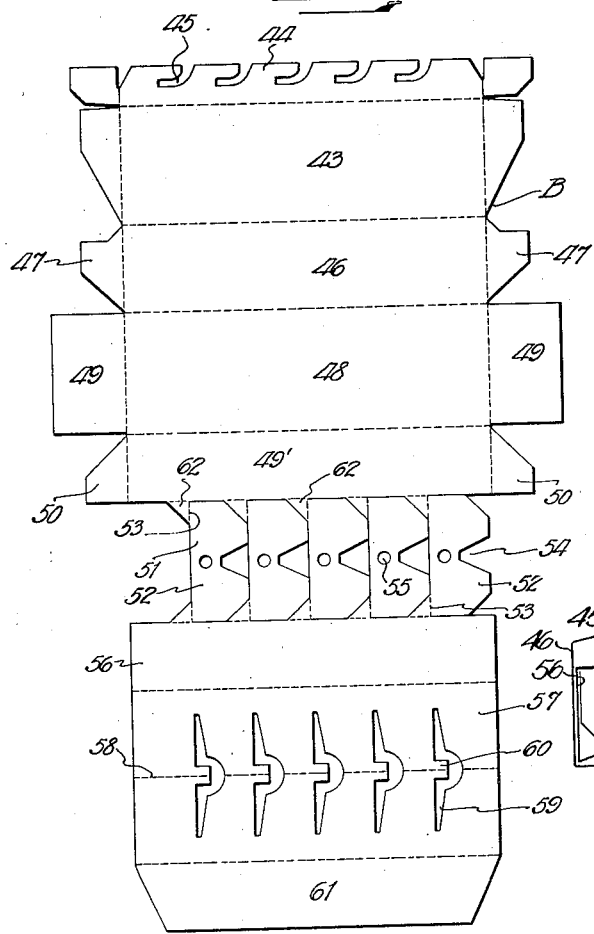
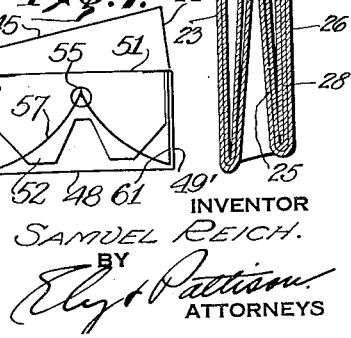
INVENTOR
SAMUEL REICH.
BY
ATTORNEYS Patented Nov. 13, 1934

1,980,597

UNITED STATES PATENT OFFICE 1,980,597

COLLAPSIBLE EGG BOX

Samuel Reich, Brooklyn, N. Y.

Application September 14, 1932, Serial No. 633,021

6 Claims. (Cl. 229—29)

This invention relates to improvements in egg boxes.

One of the main objects of the invention resides in an egg box formed from a single blank of cardboard to provide a box body into which a filler section is foldable and securely locked to provide uniform compartments for the eggs to be packed therein.

Another feature of the invention is to provide an egg box in which the filler is formed integral with the box body and the walls of the filler are reinforced and cushioned by the walls of the box body to insure the contents against breakage during shipment.

A further object of the invention is the provision of an egg box having the above features which may be collapsed to facilitate compact storing of the same, and which may be expeditiously set up for use when desired.

With these and other objects in view, the invention resides in the certain novel construction, combination and arrangement of parts, the essential features of which are hereinafter fully described, are particularly pointed out in the appended claims, and are illustrated in the accompanying drawings, in which:

Figure 1 is a plan view of the blank from which the preferred form of my egg box is constructed.

Figure 2 is a vertical transverse sectional view through the egg box in a set up condition.

Figure 3 is a fragmentary vertical longitudinal sectional view on the line 3—3 of Figure 2.

Figure 4 is a perspective view of the box in collapsed position.

Figure 5 is a vertical transverse sectional view through the box in the position shown in Figure 4.

Figure 6 is a plan view of a modified form.

Figure 7 is a vertical sectional view through the form of box shown in Figure 6 and in set up condition.

Referring to the drawings by reference characters, and especially to Figures 1 to 5 inclusive, the numeral 10 designates my improved egg box in its entirety which is formed from a single blank of cardboard A and which blank is substantially rectangular in configuration as shown in Figure 1 of the drawings. The blank A is scored transversely on the following parallel fold lines 11, 12, 13, 14, 15, 16, 17, 18, 19, and 20. The score or fold line 11 is disposed inwardly and adjacent one end of the blank A to provide a cover flap 21 while the space between the fold lines 11 and 12 constitutes a cover 22 which pivots or swings on the fold line 12, the said fold line 12 and next adjacent fold line 13 defining a rear or side wall 23 and coextensive with the side wall 23 are end flaps 24. The fold lines 13 and 15 define the bottom wall 25 which is scored midway of its width on the line 14 and the said scored line 14 is such as to permit the bottom wall 25 to fold inwardly as best seen in Figure 5 of the drawings. The fold lines 15 and 16 define a front or side wall 26 of a height slightly less than the height of the rear or side wall 23, while extending from opposite ends of the front or side wall 26 are end flaps 27. The walls and flaps hereinbefore mentioned when folded form a box body provided with a swinging cover 22, and a locking flap 21, but integral with the front or side wall 26 and foldable into the box body is the filler section now to be described and which is an integral part of the box body and foldable thereinto after the said body has been formed.

The fold lines 16 and 17 define a reinforcing front or side wall 28, while the material between the fold lines 17 and 18 constitute a false bottom 29, the same being scored on the fold line 30 so that the said bottom when the box is in set up position assumes a substantially inverted V-shape as seen in Figure 2 of the drawings. The false bottom wall 29 is provided with a row of U-shaped slots 31 which form fingers 32 for a purpose to be presently explained. These slots 31 extend the same distances on opposite sides of the fold line 30 whereas the said bottom wall 29 on opposite sides of the fold line 30 is provided with transversely disposed elongated slots 33. The fold lines 18 and 19 define a reinforcing rear or side wall 34 whereas the material between the fold lines 19 and 20 provide a top wall or bridge piece 35 between the reinforcing wall 34 and the flap 36 formed between the scored line 20 and the adjacent edge of the blank. End flaps 37 are coextensive with opposite ends of the flap 36 and when the box and filler are in set up position, the flaps 24, 27 and 37 overlap and form the end walls of the box body. The end walls of the box body are foldable outwardly on the fold line 38 extending transversely of the flaps 24.

The top wall or bridge piece 35 has transverse partition members 39 cut therefrom, and the said top walls and partition members are foldable on the longitudinal fold line 40. The partition members 39 are also foldable on the transverse fold line 41 to enable the partition members to extend downwardly at right angles to the top wall or bridge piece 35. The partition members are provided with triangular shaped slots 42 which are adapted to receive the fingers 32 of the false bottom 29 when the box is in set up position.

Assume that the blank A has been folded on the respective fold lines and the end flaps 27 and 24 secured together by gluing or in any other similar manner. With the end walls of the box secured together, the box body is formed, whereupon the filler member is folded into the box body to the position shown in Figure 2 of the drawings. When the filler section is within the box body, the inverted V-shaped bottom wall 29 is disposed in spaced relation to the bottom wall 25 of the box body and the reinforcing side walls 28 and 34 are respectively in contact with the inner side of the front or side wall 26 and rear or side wall 23 of the box body. The top wall 35 extends across the box body and the flap 36 extends inwardly and is free of the adjacent reinforcing wall 28. After the filler section has thus been folded within the box body, the partition members 39 are pushed inwardly and bend on the fold lines 41 so that the said partition members straddle the apex portion of the inverted V-shaped false bottom 29. When folded inwardly, portions of the partition members 39 enter the slots 33 in the false bottom 29 and the fingers 32 formed from the apex portion of the false bottom enter the triangular shaped slots 42 so as to lock the partition members in even spaced relation. The partition members 39 divide the box into a plurality of uniform egg compartments or cells, the said eggs resting upon the false bottom 29 and spaced by the adjacent partition members 39. When the cover 22 is closed the locking flap 21 is inserted between the flap 20 and the adjacent reinforcing wall 28 of the filler section.

From the foregoing description it will be seen that the side walls and bottom wall of the box body serves to protect the walls of the filler and materially strengthen the box to avoid damage of the eggs packed therein.

By reference to Figures 4 and 5 of the drawings, it will be seen that the box in its entirety may be collapsed due to the fact that the partition members 39 are foldable on the line 40 and the bottom wall 35 of the box body is foldable inwardly on the scored line 14, whereas the end walls of the box fold outwardly on the line 38. The flap 21 may be folded over the cover 22 and when the box is so folded, a relatively flat and compact structure is provided which facilitates the storing of a supply of boxes in a relatively small amount of space.

In Figure 6 of the drawings, I have illustrated a modified form of blank which is quite similar to the form of the invention shown in the preferred form with the exception that the location of the false bottom wall and the top wall from which the partition members are cut have been transposed. In this form, B designates the cardboard blank in its entirety and which is cut and scored to provide a cover 43, an adjacent locking flap 44 having notches or slots 45 extending inwardly from the edge thereof. Contiguous with the cover 43 is an outer side wall 46 from opposite ends of which end flaps 47 extend. The bottom wall 48 is adjacent the outer side wall 46 and end flaps 49 extend from opposite sides thereof. Contiguous with the bottom 48 is an outer side wall 49' from which end flaps 50 extend. The parts just mentioned when folded on the dotted lines provide a box body and a cover provided with a locking flap and foldable into such a body is the filler now to be described. Integral with the side wall 49' is a top wall 51 of the filler from which transverse partitions 52 are cut, and are adapted to be bent on the scored lines 53. The transverse partition members 52 are provided with V-shaped cut outs or notches 54 and with openings 55. Integral with the top wall 51 of the filler is an inner side wall 56 and adjacent thereto is a false bottom 57 foldable inwardly on the line 58. The false bottom 57 is provided with transversely disposed slots 59 which extend on opposite sides of the fold line 58 and extending into the said slots at the point of fold 58 are fingers 60. A reinforcing flap 61 extends from the false bottom 57.

After the box body has been formed in the manner just described, the filler section is folded within the box body, the false bottom 57 being set in position in the manner similar to that shown in the preferred form, after which the transverse partition members 51 are folded inwardly and the ends are received in the slots 59 whereas the fingers 60 enter the openings 55 in the partition members for locking the said members in set up position. As before mentioned this form is similar to the preferred form with the exception that certain parts have been transposed.

The locking flap 44 provided with the slots or notches 45 engages the portions 62 of the top wall when the cover 43 is in closed position. The hooked portions formed by the notches 45 engage beneath the portions 63.

Whereas I have shown and described what I consider to be the most practical embodiment of my invention, I wish it to be understood that various changes that come within the scope of the appended claims may be resorted to if desired.

Having thus described the invention, what I claim as new and desire to secure by Letters Patent is:—

1. A foldable egg box comprising a box body open at its top and provided with an inwardly foldable bottom wall, a filler section folded into said box body and integral with one of the side walls thereof, said filler section including a bottom wall of substantially inverted V-shape, spaced transverse partition members, and interfitting means between the apex portion of said V-shaped bottom wall and the respective partition members for securing said partition members in fixed even spaced relation cross wise of said V-shaped bottom wall.

2. A foldable egg box comprising a box body open at its top and provided with an inwardly foldable bottom wall, a filler section folded into said box body and integral with one of the side walls thereof, said filler section including a bottom wall of substantially inverted V-shape extending inwardly and upwardly from the lower ends of the side walls of said box body, spaced transverse partition members, and interfitting means for securing said partition members in fixed even spaced relation crosswise of said V-shaped bottom wall when the box is in set up position, said bottom wall folding inwardly of the inverted V-shaped bottom wall when said box body is collapsed.

3. A folding egg box comprising a box body having an inwardly foldable bottom wall and side walls, a false bottom of inverted V-shape, upstanding reinforcing walls integral with said false bottom, one of the upstanding walls being integral with one of the side walls, said upstanding walls being disposed against the inner sides of the side walls of the box body, spaced transverse cross pieces bridging the tops of said upstanding walls, and transverse partition members depending from said cross pieces and dividing the space between the cross pieces and false bottom into separate compartments.

4. A folding egg box comprising a box body having an inwardly foldable bottom wall, side walls, and a hinged cover, a filler section integral with one of said side walls and comprising a false bottom of inverted V-shape, upstanding side walls fitting against the inside of the side walls of said box body, a top wall integral with one of the upstanding walls and extending across said box body toward the other upstanding wall, and partition members cut and bent downward from said top wall.

5. A folding egg box comprising a box body having a bottom wall, side walls, and a hinged cover, a filler section integral with one of said side walls and comprising a false bottom of inverted V-shape, upstanding side walls fitting against the inside of the side walls of said box body, a top wall integral with one of the upstanding walls and extending across said box body toward the other upstanding wall, and partition members cut and bent downward from said top wall, a flap coextensive with said top wall and extending downwardly and adjacent an upstanding wall, and a locking flap carried by said cover and fitting between said flap and the adjacent upstanding wall when said cover is in closed position.

6. A folding cardboard egg box comprising a box body having opposed side walls, and an inwardly foldable bottom wall, a foldable false bottom wall of inverted V-shape, and transverse partition members integral with said false bottom and foldable therewith.

SAMUEL REICH.